(12) United States Patent
Kudo

(10) Patent No.: US 9,090,110 B2
(45) Date of Patent: Jul. 28, 2015

(54) SETTING APPARATUS, SETTING METHOD, AND PROGRAM

(75) Inventor: Naotoshi Kudo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 13/443,263

(22) Filed: Apr. 10, 2012

(65) Prior Publication Data

US 2012/0262759 A1    Oct. 18, 2012

(30) Foreign Application Priority Data

Apr. 14, 2011    (JP) .................................. 2011-090368

(51) Int. Cl.
| | | |
|---|---|---|
| *G06K 15/00* | (2006.01) | |
| *B41J 11/36* | (2006.01) | |
| *G06K 15/02* | (2006.01) | |
| *G06F 3/12* | (2006.01) | |
| *B41J 11/66* | (2006.01) | |
| *B41J 15/16* | (2006.01) | |

(52) U.S. Cl.
CPC ................. *B41J 11/36* (2013.01); *B41J 11/663* (2013.01); *B41J 15/16* (2013.01); *G06F 3/1296* (2013.01); *G06K 15/02* (2013.01); *H04N 2201/0094* (2013.01)

(58) Field of Classification Search
USPC ......... 358/1.2, 1.12, 1.15, 304; 399/384, 385; 400/39, 314.3, 342, 344
See application file for complete search history.

(56) References Cited

U.S. PATENT DOCUMENTS

2010/0309495 A1 * 12/2010 Nakagawa ..................... 358/1.9

FOREIGN PATENT DOCUMENTS

| JP | 2002-068601 A | 3/2002 |
|---|---|---|
| JP | 2006-123238 A | 5/2006 |
| JP | 2006-168012 A | 6/2006 |
| JP | 2009-190292 A | 8/2009 |

* cited by examiner

*Primary Examiner* — Vu B Hang
(74) *Attorney, Agent, or Firm* — Canon USA Inc. IP Division

(57) ABSTRACT

A setting apparatus capable of setting a length of a margin provided for a recording medium on which an image is recorded by a recording unit confirms information about a length of an outer periphery when the recording medium on which the image is recorded is rolled in a roll shape, and sets a length of a margin provided for the recording medium based on the confirmed information.

15 Claims, 6 Drawing Sheets

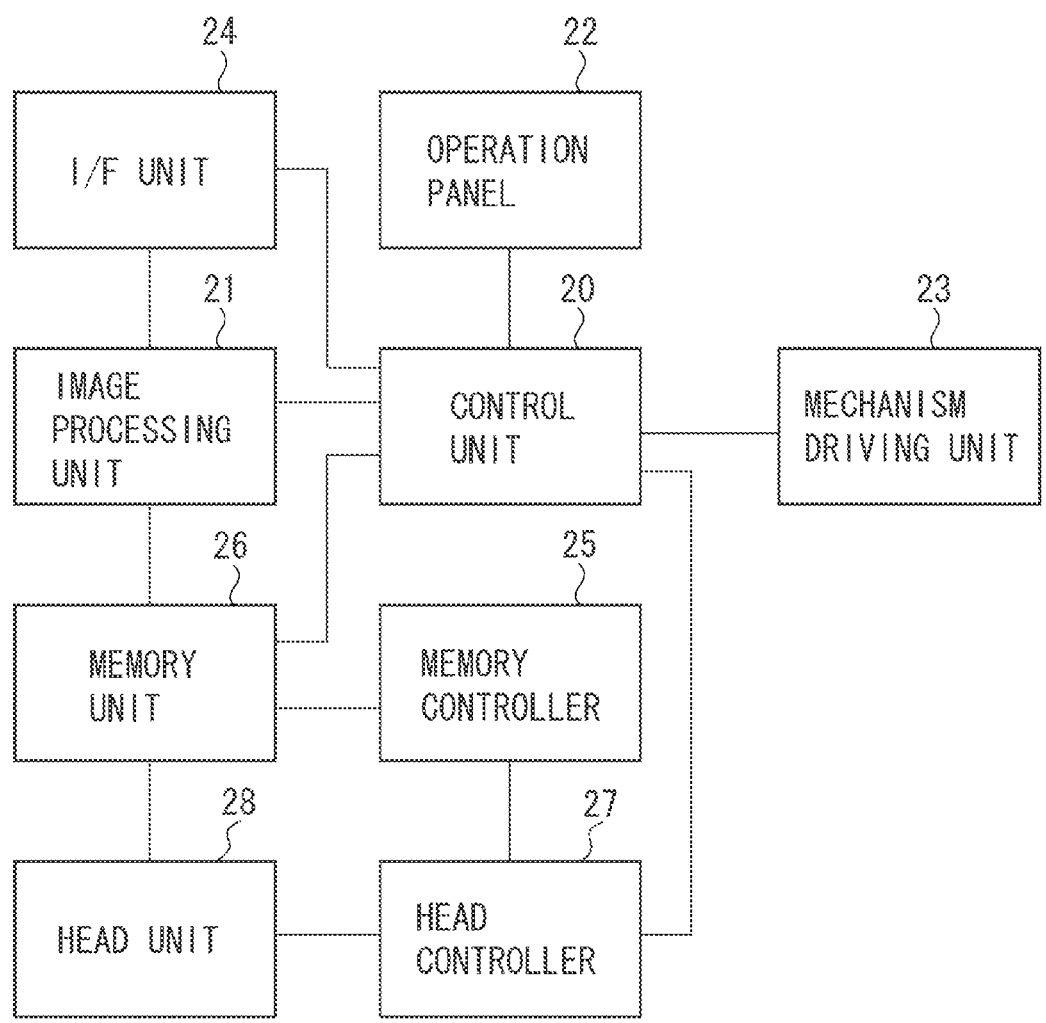

SETTING APPARATUS, SETTING METHOD, AND PROGRAM

BACKGROUND OF THE INVENTION

1. Field of the Invention

The present invention relates to a setting apparatus and a setting method for setting a length of a margin provided for a recording medium.

2. Description of the Related Art

A conventional recording apparatus is known that rolls a recording medium on which recording has been performed by a rolling device, cuts it by a cutting unit, and separates it off after recording has been finished to store it in a roll shape (Japanese Patent Application Laid-Open No. 2009-190292. Such a recording apparatus can realize recording with no margin, by cutting the recording medium with no margin provided before and after an image, and also can cut the recording medium with the margin provided before and after the image.

When the recording medium is cut with the margin provided before and after the image, the recording apparatus discussed in Japanese Patent Application Laid-Open No. 2009-190292 cuts the recording medium provided with a minimum possible margin to waste no recording medium. Therefore, when the recording medium is stored in a roll shape, the image is exposed on an outer periphery of the recording medium. If the recording medium is stored as it is, the image can be damaged, or contaminated with dust.

SUMMARY OF THE INVENTION

One aspect of the present invention is to provide a setting apparatus and a setting method for solving the above-described problem.

Another aspect of the present invention is to provide a setting apparatus and a setting method capable of reducing damage and contamination of an image when a recording medium is rolled and stored in a roll shape.

BRIEF DESCRIPTION OF THE DRAWINGS

FIG. 2 is a block diagram illustrating a control configuration of the recording apparatus to which the present invention can be applied.

DESCRIPTION OF THE EMBODIMENTS

Figure 1A:
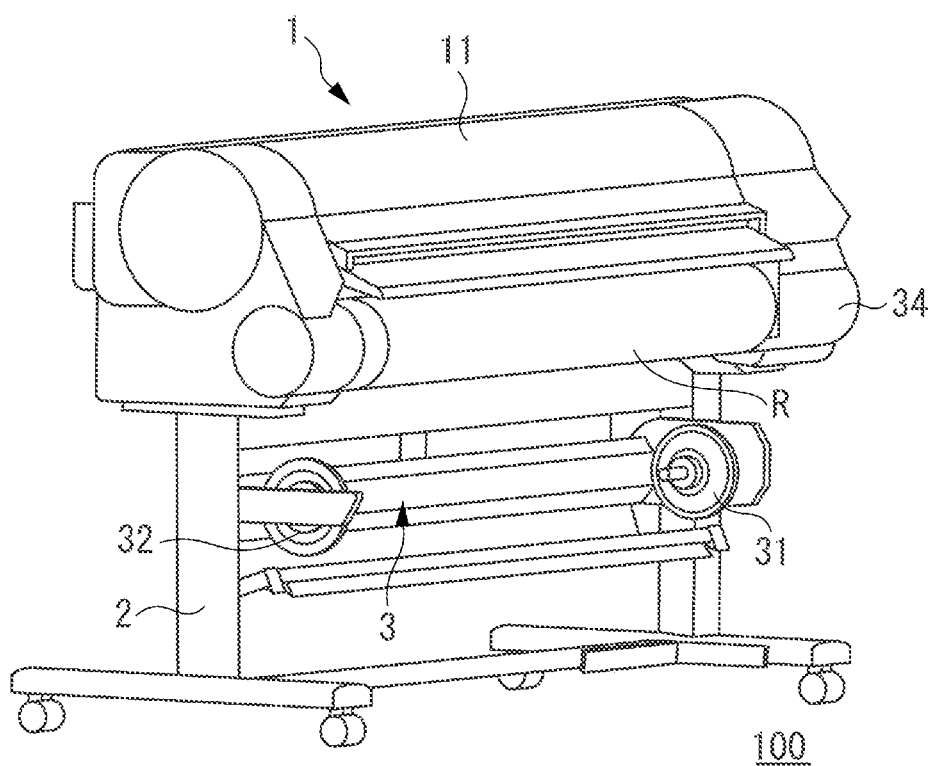
FIGS. 1A to 1D are schematic perspective views of a recording apparatus to which the present invention can be applied.

FIG. 1A is a schematic perspective view of an ink-jet recording apparatus (herebelow, simply referred to as a recording apparatus) to which the present invention can be applied.

A recording apparatus 100 includes an apparatus main body (main body unit) 1 on stands 2. On a front side of the main body unit 1, a recording medium (rolled paper) "R" rolled on a paper pipe is set.

Further, the main body unit 1 includes a paper feeding unit that feeds (conveys) the recording medium "R" to a recording position as unrolling the recording medium "R", and a paper-feeding mechanism 34 including a rolling back unit for rolling back the unrolled recording medium. After an image is recorded on the recording medium unrolled from the paper-feeding mechanism 34 at the recording position as the recording medium is being conveyed while turning around, the recording medium is discharged from the front side of the main body unit 1.

Below the main body unit 1, a rolling device 3 is provided to roll the recording medium on which the image is recorded in the main body unit 1. The rolling device 3 rolls the recording medium conveyed from the main body unit 1 on the paper pipe (not illustrated) held between a rolling driving unit 31 and a rolling movable unit 32. The rolling driving unit 31 includes therein a motor (not illustrated) for rotating the paper pipe based on a signal of an encoder.

Further, the rolling movable unit 32 can be moved in a width direction indicated with both arrows "C", and a user can move the rolling movable unit 32 according to a length (width size of recording medium) of the paper pipe to be held. For example, when the recording medium having a width of 60 inches is set, the rolling movable unit 32 is moved to a position for holding the 60-inch paper tube.

To use the rolling device 3, the user mounts the paper pipe into the rolling device 3, and attach a leading edge of the recording medium "R" to the paper pipe with tape or the like. Subsequently, the main-body unit 1 rotates the paper pipe mounted into the rolling device 3 every time the recording medium on which the image is recorded is conveyed, to roll the recording medium around the paper pipe. When the recording medium on which the image is recorded is rolled, to prevent undried ink right after recording from being transferred onto the recording medium, as much as possible, the rolling device 3 according to the present exemplary embodiment rolls the recording medium with the image on the outer side.

Further, from a rotation angle detected by the encoder of the rolling device 3 (rolling driving unit 31), a length of an outer periphery of the recording medium rolled by the rolling device 3 can be calculated. For example, when an angle detected by the encoder is "0" degree (reference point), a conveyance amount of the recording medium from a "0" degree last time (reference point) to a "0" degree this time conveyed by the conveyance roller during one rotation corresponds to the length of the outer periphery of the recording medium rolled by the rolling device 3.

For example, when the conveyance roller sends the recording medium by 100 mm, the outer periphery of the recording medium is 100 mm. Since this calculation of the length of the outer periphery is continued while the conveyance roller is being driven to roll the recording medium by the rolling device 3, the length of the outer periphery can be always grasped. Further, when the recording medium is cut, in addition to the recording medium already rolled by the rolling device 3 at this stage, the recording medium located between the rolling device 3 and a cutting position is eventually also rolled by the rolling device 3.

Thus, the outer periphery of the recording medium rolled by the rolling device 3 may be calculated by the above-described method, and correct the calculated value according to a distance from the rolling device 3 to the cutting position, and then the outer periphery of the recording medium may be calculated more accurately.

Figure 1B:
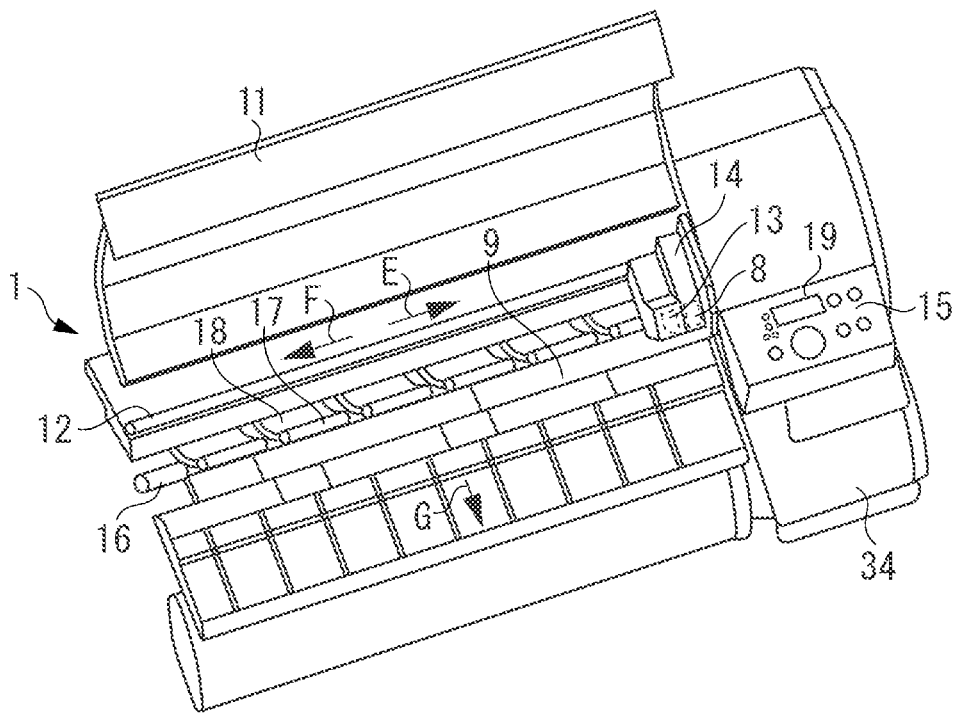

FIG. 1B is a perspective view of an inside of the main-body unit 1. An opening/closing cover 11 is provided at a top of the main-body unit 1, and the user can access an inside mechanism by opening the opening/closing cover 11. The main body unit 1 is provided with a carriage 14 that includes a recording head 8 and moves back and forth in the width direction of the recording medium.

At a position opposing the recording head 8, a platen 9 for guiding and supporting the recording medium on which the image is recorded by the recording head 8 is disposed. At an upstream side of conveyance on the platen 9 (according to the present exemplary embodiment, in the turning-around conveyance path in the main body unit 1, at a position closer to the recording medium "R" on the paper pipe set in the paper-feeding mechanism 34), a conveyance roller 16 for conveying [feeding] the recording medium is disposed.

A plurality of pinch rollers 17 supported by an axis of the roller holder 18 for the conveyance roller 16 are pressed with an elasticity force of the plurality of pinch rollers 17 to apply a conveyance force to the recording medium held by.

At the recording position, while the carriage 14 is moving (performing main scanning) in directions of arrows "E" and "F" along a rail 12, based on the recording data, the ink is discharged from the recording head 8 onto the recording medium to record the image. By alternately repeating recording on one line in synchronization with a movement of the carriage 14, and conveying (feeding a sheet) the recording medium at a predetermined pitch in an arrow "G" direction by a conveyance roller 16, the image is recorded on the recording medium.

The carriage 14 includes a cutting unit 13 (cutter unit) for cutting the recording medium. When the carriage 14 is moved in a main-scanning direction to thrust the cutting unit 13 to an abutment member, a blade comes out of the cutting unit 13.

In this state, the carriage 14 is moved in the arrow "E" or "F" direction to cut the recording medium. At a side opposite to a direction in which the carriage 14 is a moved, a protrusion similar to the abutment member is provided. When the blade in the cutting unit 13 contacts the protrusion, the cutting unit 13 houses the blade. When the user wants to remove the recording medium rolled by the rolling device 3 after recording has been finished, the user presses a cut button on an operation panel 15.

Subsequently, the recording medium is conveyed to a downstream side and cut by the cutting unit 13, and it can be removed. Further, when the user performs an operation for removing the medium via the operation panel 15, it is inquired to the user whether to cut the recording medium by display on a monitor 19. When the user gives an instruction to cut, as described above, the recording medium is cut by the cutting unit 13.

The carriage 14 includes a sensor unit (not illustrated), which can detect a position of an end portion of the recording medium. The sensor unit includes various types of light-emitting diodes (LED) and can measure end portions and thicknesses of various recording mediums. Further, it can calculate a width of the recording medium based on a difference of positional information between right and left end portion of the recording medium.

When a right end and a left end of the recording medium are not uniform, the user can input and specify its width when mounting the medium. Further, in addition to the sensor unit, a medium-detecting sensor (not illustrated) is provided on the platen at the upstream side in the conveyance direction. The medium-detecting sensor is an optical sensor including a light-emitting element and a light-receiving element, emits light from the light-emitting element, and detects existence or non-existence of the medium by receiving the light reflected by the light-receiving element.

Figure 1C:
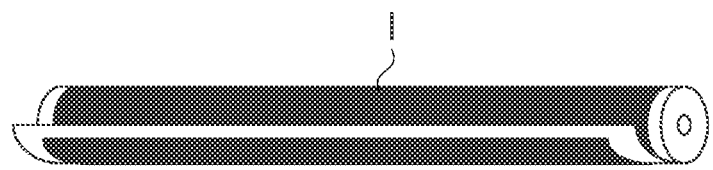

FIG. 1C illustrates a state of the recording medium rolled by the rolling device 3 when the recording medium is cut leaving some margin from a trailing edge of the image. In this case, as shown from FIG. 1C, the image is exposed on the outer periphery of the recording medium, and thus, it is likely that the image is damaged or contaminated with dust.

Figure 1D:

FIG. 1D illustrates a state of the recording medium rolled by the rolling device 3 when the recording medium is cut providing further a margin from a normal cutting position as described below in the recording apparatus 100 according to the present exemplary embodiment. As described above, according to the present exemplary embodiment, the recording medium can avoid being exposed on the outer periphery of the recording medium.

FIG. 2 is a block diagram illustrating a control configuration of the recording apparatus 100 according to the present exemplary embodiment. In FIG. 2, a control unit 20 controls the overall recording apparatus. An interface (I/F) unit 24 is connected to a host computer (not illustrated), and a command and recording data for performing recording are transmitted from the host computer to the recording apparatus. The recording apparatus 100 starts a recording operation according to the command, and performs recording on the recording medium based on the recording data.

Further, information about the recording apparatus is transmitted to the host computer via the I/F unit 24, and a state (e.g., recording status) of the recording apparatus is notified to the user. An image processing unit 21 performs γ correction, color processing, enlarging/reducing processing, and binary processing on multi-value image data transmitted from the I/F unit 24. The image processing unit 21 includes a memory, application specific integrated circuit (ASIC), digital signal processing (DSP), and a reduced instruction set computer (RISC) chip. The binary recording data expanded as a dot pattern by the image processing unit 21 is once stored in a memory unit 26.

This memory unit 26 includes a memory of one band or more, which is necessary for a recording head to perform scanning and recording once in the main-scanning direction. The memory unit 26 is also used to store information about the position of the end portion and the width of the recording medium, and information about a length of the outer periphery of the recording medium rolled by the rolling device 3. A memory controller 25 performs writing/reading of the recording data to/from the memory unit 26 under control of DSP of the image processing unit 21 or the RISC chip to generate an address signal and a writing/reading timing signal for the memory unit 26.

Further, the recording data is read from the memory unit 26 in synchronization with a reading signal from a head controller 27, and is output to the head controller 27. The head controller 27 generates, based on a signal from a linear scale (not illustrated), a timing signal for discharging the ink of a head unit 28 (recording head 8) and a heat pulse. Based on the generated timing signal and heat pulse, the control unit 20 and the head controller 27 heat up a heating unit of the head unit 28 (recording head 8) corresponding to each ink and cause the ink to be discharged to record the image on the recording medium.

The head unit 28 is mounted on the carriage 14 of a mechanism driving unit 23. The mechanism driving unit 23 includes a carriage unit and a carriage driving unit for moving the recording head in the main-scanning direction, a medium control unit for conveying the recording medium, and a recovery unit for recovering the recording head from ink choke. Furthermore, the mechanism driving unit 23 includes the rolling device 3 for rolling the recording medium, the encoders, and sensors.

The control unit 20 controls a recording operation according to various information (e.g., a type of a recording medium and a recording mode) input via the operation panel 15. Further, as described below, the control unit 20 performs a cutting operation on the recording medium in response to pressing of the cut button on the operation panel 15 by the user.

The sensor unit detecting the end portion of the recording medium is mounted on the carriage 14. A position at which strength of the signal output by the sensor unit is changed while the carriage 14 is being moved is calculated based on the signal from the linear scale (not illustrated) to acquire information about the end portion in the width direction (main-scanning direction) of the recording medium.

The control unit 20 calculates the width of the recording medium based on the above-described positional information about the end portion. When the recording medium is conveyed, a position on the conveyance roller is calculated where an output signal of the sensor unit mounted on the carriage 14 and fixed at a specific position, changes, based on the signal from another encoder. Thus, the positional information about the leading edge of the recording medium is acquired. Similarly, a position on the conveyance roller at which an output signal of the medium-detecting sensor changes is calculated to acquire the positional information about the trailing edge of the recording medium.

The recording apparatus 100 manages a recording region of the recording medium and the position at which the cutter unit (cutting device) 13 performs cutting based on the acquired positional information about a leading edge. The memory unit 26 stores the information about the recording medium including the calculated end portion and width of the recording medium. Further, the memory unit 26 stores various programs including the processing described with reference to the flowcharts illustrated in FIGS. 3 and 5, and the control unit 20 reads and executes the program stored in the memory unit 26 to perform the following processing.

Figure 3:
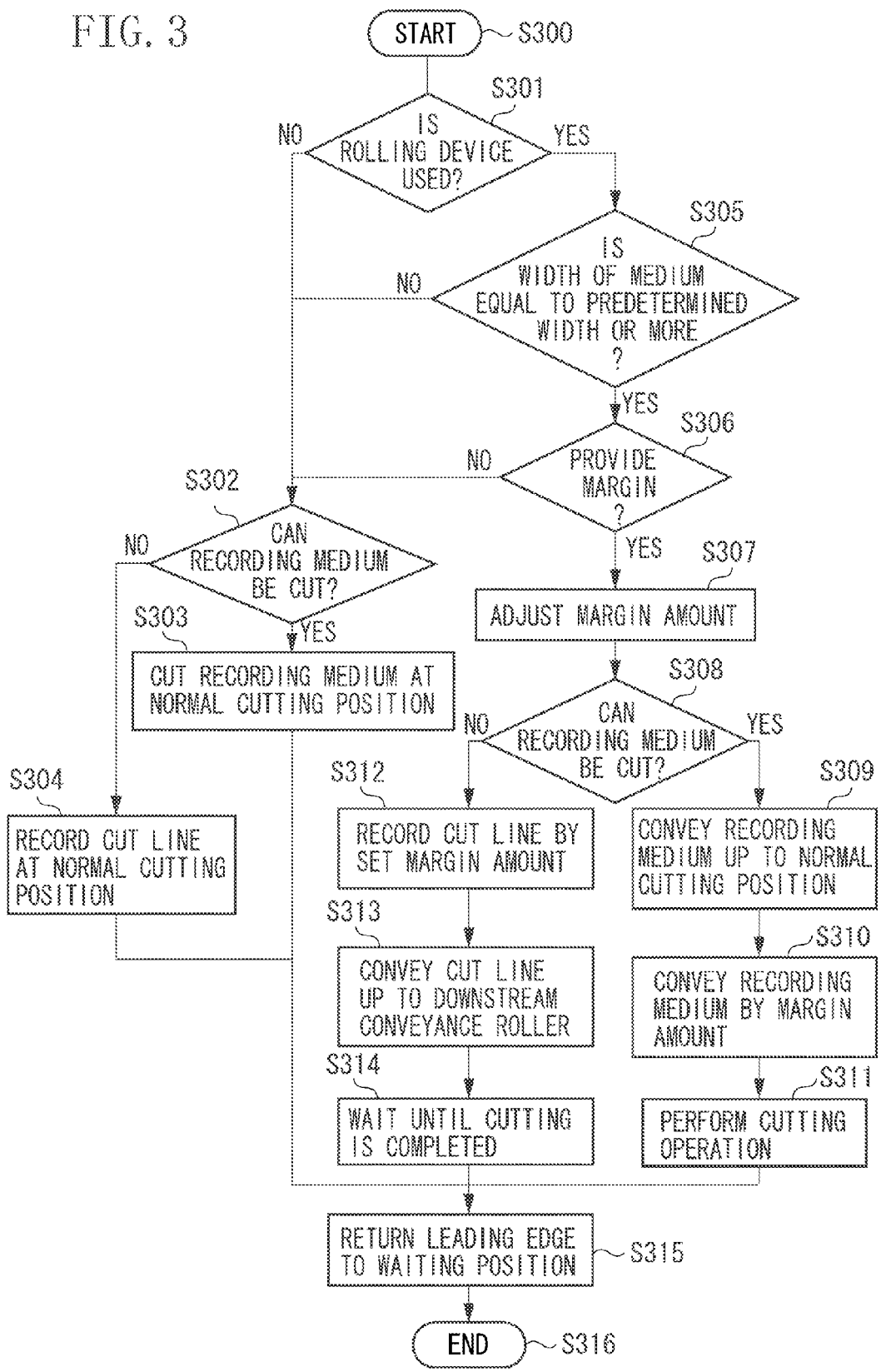
FIGS. 3 and 5 are flowcharts illustrating flows of processing according to exemplary embodiments.

FIG. 3 is a flowchart illustrating a cutting operation according to the present exemplary embodiment. Such a cutting operation is performed, as described above, to remove the recording medium, when the user presses the cut button on the operation panel 15 or the user removes the medium via the operation panel 15. According to the present exemplary embodiment, when the cut button is pressed, "cut?" is displayed on the monitor 19 to confirm the user's intension.

When the user selects "NO" via the operation panel 15, the operation is canceled. When the user selects "YES" in step S300, the recording medium cutting operation is started. Also, when a menu of removing the medium is performed from the menu on the operation panel 15, "cut?" is displayed on the monitor 19, and the processing similar to the above-described operation is performed. Then in step S300, the cutting operation of the recording medium is started. When recording is performed up to a vicinity of the trailing edge of the recording medium and the recording medium is removed without cutting, "NO" may be selected.

When the recording medium is not cut, guidance for removing the recording medium is displayed on the display 19. Then, a lever (not illustrated) is released to remove the medium. Alternatively, the recording medium may be automatically discharged when recording is performed up to the trailing edge of the recording medium.

In step S300, when the cutting operation of the recording medium is started, in step S301, the control unit 20 determines whether the rolling device 3 is used. In the recording apparatus 100 according to the present exemplary embodiment, when recording is performed using the rolling device 3 (YES in step S301), firstly, the user selects a mode for using the rolling device 3 via the operation panel 15.

According to the instruction, the leading edge of the recording medium is conveyed close to the rolling device 3 and the user attaches the leading edge of the recording medium to the paper pipe in the rolling device 3 with the tape. Thus, preparation of the mode for using the rolling device 3 is completed. In step S301, depending on whether the mode for using the rolling device 3 is selected when recording is started, it is determined whether the rolling device 3 is used.

When the rolling device 3 is not used (NO in step S301), the processing proceeds to step S302, and the control unit 20 determines whether the recording medium can be cut by the cutting unit 13. The recording apparatus 100 according to the present exemplary embodiment can perform recording on various recording media such as a medium kin to plastic, thick paper, and medium kin to cloth. Accordingly, the recording media of some types cannot be cut by the cutting unit 13 included in the recording apparatus 100. Further, under specific circumstances, some recording media cannot be cut so well.

Therefore, in step S302, whether the media in use can be cut is determined. When it is determined that the recording medium in use can be cut (YES in step S302), the processing proceeds to step S303. In step S303, the control unit 20 gives an instruction to the mechanism driving unit 23 to convey the recording medium to be cut at a normal cutting position described below and move the carriage 14 right and left to cut the recording medium.

According to the present exemplary embodiment, when normal recording with a margin (bordered recording) is performed, the recording medium is provided with the margin of 5 mm from a trailing edge of the image. The position 5 mm away from the trailing edge of the image is used as a normal cutting position. After the image has been recorded, the normal cutting position is controlled to be located at an 8 mm-downstream position from the conveyance roller, which is used as a waiting position. On the other hand, the position at which the blade in the cutting unit 13 contacts the recording medium is about 70 mm downstream from the conveyance roller. Therefore, when the recording medium is cut at the normal cutting position, the recording medium of 62 mm acquired by subtracting 8 mm from 70 mm is conveyed to the downstream side and the carriage is operated to cut the recording medium.

After the recording medium is cut, in step S313, the recording medium is rolled back so that the leading edge is located at the waiting position 8 mm upstream from the conveyance roller, and then the processing is finished in a recording waiting state. When recording with no margin (borderless recording) is performed, the recording medium is cut at the position 1 mm inside from the trailing edge of the image, which is the normal cutting position.

On the other hand, in step S302, when it is determined that the recording medium in use cannot be cut (NO in step S302), an image indicating a cut line as a position for cutting is recorded on the recording medium, and the user cuts the recording medium with scissors or the like. In this case, in step S304, the cut line is recorded at the normal cutting position, and the recording medium is conveyed so that the cut line is located at the downstream side of the platen, thus the use can easily cut the recording medium.

When it is determined that the rolling device 3 is used (YES in step S301), the processing proceeds to step S305, and the control unit 20 determines whether the width of the recording medium currently mounted is equal to or larger than a predetermined width thereof. When the width of the recording medium is shorter and thus the user can remove it without touching a recording surface of the recording medium (NO in step S305), staining of the image on the recording medium is unlikely when the recording medium is removed. Therefore, the processing proceeds to step S302, and the control unit 20 gives an instruction to the mechanism driving unit 23 to cut the recording medium at the normal cutting position or the head controller 27 to record the cut line.

According to the present exemplary embodiment, by performing the step S302, next processing does not need to further provide the margin behind the normal cutting position. In other words, when the recording medium can be conveyed without touching an image recording surface by the user, the more margin does not need to be provided, thereby saving the recording medium.

When it is determined that the width of the recording medium is equal to or more than the predetermined width (YES in step S305), in step S306, the control unit 20 displays on the monitor 19 inquiry about whether to provide the more margin behind the normal cutting position to cause the user to make a selection. When the user selects to provide no more margin (NO in step S306), the processing proceeds to step S302, and the control unit 20 gives an instruction to the mechanism driving unit 23 to cut the recording medium at the normal cutting position or the head controller 27 to perform recording of the cut line.

When the user selects to provide the more margin behind the normal cutting position (YES in step S306), the processing proceeds to step S307, and the control unit 20 adjusts the length (margin amount) of the margin provided behind the normal cutting position. Herein, the control unit 20 confirms the length of the outer periphery of the recording medium rolled by the rolling device 3, calculates the margin amount based on the confirmed length of the outer periphery, and then sets the margin amount at the trailing edge of the recording medium when it is stored in a roll shape. Subsequently, the user can adjust the margin amount via the operation panel 15.

Figure 4:
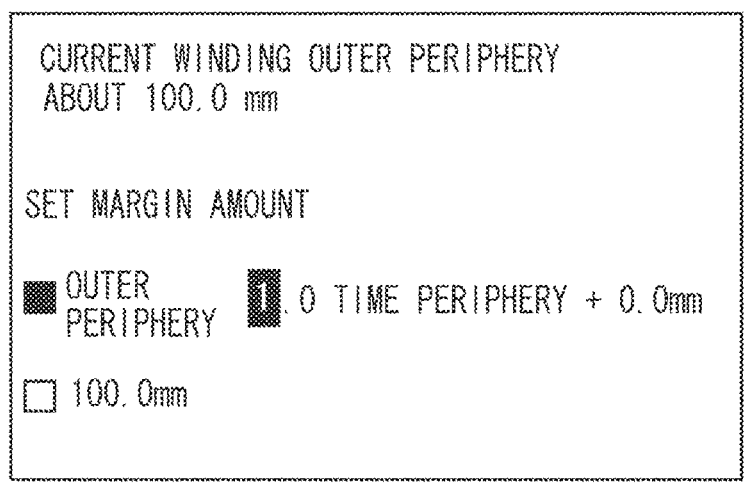
FIG. 4 illustrates an example of a screen for setting a margin amount.

FIG. 4 is an example of a setting screen of the margin amount displayed on the monitor 19. The monitor 19 displays the outer periphery of the recording medium rolled by the rolling device 3 by 0.1 mm, and the user is informed of the outer periphery of the recording medium rolled by the rolling device 3 as such, to easily increase or decrease the margin amount by a millimeter. According to the present exemplary embodiment, the adjustment of the margin amount is performed in either a mode of specifying the margin amount by a number of layers of external peripheries or a mode of directly specifying the margin amount by a millimeter.

FIG. 4 illustrates that square boxes on the left side, which specify the margin amount by an eternal periphery, are selected in black. Below the black square boxes, there is a specification portion for specifying the margin amount by a millimeter. The specification portion is in white, which means it is not selected. As described above, according to the present exemplary embodiment, to specify the margin amount by an outer periphery, at the right side of the portion for specifying the number of external peripheries, a portion is provided where the margin amount can be increased/decreased by a millimeter to set the margin amount in detail.

As a value in the specification portion for specifying a number of external peripheries, the amount of "1" outer periphery is displayed so that the numeral value can be increased/decreased via an up/down key on the operation panel 15. This default value is based on the length of the outer periphery confirmed by the control unit 20. In FIG. 4, a cursor can be moved by a right/left key on the operation panel 15, and it is located at a position for specifying the margin amount by an outer periphery. The cursor can be moved to the portion to be specified by a millimeter after the decimal point. Every time the right key is pressed, those values can be changed.

Further, the specification portion for directly specifying the value by a millimeter can specify a minus value. On both of a plus side and a minus side, up to one round can be specified. The user can correct an error via the specification portion by a millimeter when the outer periphery of the rolled recording medium is calculated. Further, for example, when the tape is stitched and a more margin is to be set, the specification by a millimeter is useful. Furthermore, the specification portion by a millimeter can adjust the margin amount in consideration of the environment of a storage location, since the recording medium can expand/shrink depending on the environment.

When the right key is further pressed, the cursor is moved to the specification portion for specifying the margin amount by a millimeter, and changes to a mode of specifying all the margin amounts by a millimeter. According to the present exemplary embodiment, the outer periphery of the rolled recording medium is calculated and displayed on the monitor 19, and the value is also displayed at the specification portion by a millimeter as a default value. The user can increase/decrease the margin amount from the default value by pointing the cursor.

After the margin amount is specified, the OK key is pressed to determine the adjustment of the margin amount, and then the processing is ended. As described above, the control unit 20 adjusts the margin amount set based on the length of the outer periphery of the recording medium rolled by the rolling device 3, according to a user's adjustment instruction.

FIG. 4 illustrates an example in which both of the specification portions for specifying the margin amount by an outer periphery and for directly specifying it by an millimeter are displayed on the monitor 19, however, only either one of them may be displayed.

In step S308, the control unit 20 determines whether the recording medium can be cut, and based on the set margin amount, further determines whether to perform the processing for cutting the recording medium or for recording a cut mark. In step S308, the processing same as that in step S302 is performed.

When it is determined that the recording medium in use can be cut (YES in step S308), the processing proceeds to step S309. The control unit 20 gives an instruction to the mechanism driving unit 23 to convey the recording medium so that the normal cutting position is located at the position 8 mm downstream from the conveyance roller. Subsequently, in step S310, the recording medium is further conveyed by the margin amount set in step S307 to be cut with the margin amount provided further to the normal cutting position. In step S311, similarly to step S303, the carriage 14 is moved right and left to perform the cutting operation. In step S315, the leading edge of the separated recording medium at a feeding paper side is returned to the waiting position, and then the processing is ended.

On the other hand, when it is determined that the recording medium in use cannot be cut (NO in step S308), the control unit 20 gives an instruction to the head controller 27 to record the cut line on the recording medium. With this processing, the user is caused to cut the recording medium with a scissor or the like. In such a case, in step S312, the control unit 20 gives an instruction to the head controller 27 to record the cut line at a position where the margin amount is provided further to the normal cutting position.

At this point, when the cut line is recorded on each image for the purpose of separating the images from one another, the cut line is recorded at a position where the margin of 5 mm is provided (normal cutting position) from the trailing edge of the image, and also the cut line is recorded at a portion where an additional margin amount is further provided to the position described above. After the cut line is recorded, in step S313, the recording medium is conveyed so that the cut line is located at the downstream side of the platen, and thus the user can easily cut the recording medium.

In step S314, the user is notified to cut the recording medium and press the OK key when cutting is finished. The control unit 20 waits until the user completes cutting. After the user completes cutting of the recording medium, when the user presses the OK key on the operation panel 15, in step S315, the leading edge of the recording medium is detected. The detected leading edge of the recording medium is returned to the waiting position, and the processing is ended.

In the descriptions described above, in step S307, the one round of the outer periphery of the recording medium is defined as a default value of a margin amount. The margin amount is adjusted according to the user's adjustment instruction via the operation panel 15. However, the user's instruction can be omitted. In other words, the calculated one round of the outer periphery may be automatically determined as the margin amount. Alternatively, in consideration of expansion/shrinkage of the recording medium, one round +5 mm may be automatically determined.

In other words, according to the present exemplary embodiment, the length of the outer periphery of the recording medium rolled by rolling device 3 is determined, and based on the determined value, the margin amount is set. Thus, when the recording medium is cut with the margin amount set at the trailing edge of the image and stored in a state of the rolled recording medium, the damage and contamination of the image with dust can be reduced. Further, as described in step S305 illustrated in FIG. 3, the set margin amount may be adjusted according to the user's instruction.

To efficiently reduce the damage and contamination of the image with dust when the rolled recording medium is stored, one or more peripheries of the outer periphery of the recording medium rolled by the rolling device 3 is to be provided as the margin. Therefore, when the recording apparatus 100 automatically sets the margin amount, the margin amount is to be the one or more rounds of the external periphery.

Further, when the user can adjust the margin amount via the operation panel 15, selection (instruction) of the margin amount of less than one round of the outer periphery may be prohibited, or when the margin amount of less than one round thereof is selected, a warning may be issued, for example.

Further, the outer periphery of the recording medium rolled by the rolling device 3 is acquired and the acquired outer periphery is corrected according to the length from the rolling device 3 to the cutting position so that when the recording medium is finally stored in a roll shape, the outer periphery can be more accurately acquired. Furthermore, a method for calculating the outer periphery of the recording medium rolled by the rolling device 3 is not limited to the examples described according to the present exemplary embodiment.

For example, the outer periphery of the recording medium when it is stored in a roll shape may be calculated based on a value of a diameter of the paper pipe on which the recording medium is rolled, which is input by the user via the operation panel 15. Further, the value of the length of the outer periphery of the paper pipe may be input by the user via the operation panel 15, and the outer periphery of the recording medium when the recording medium is stored in a roll shape may be calculated.

Furthermore, the length of the recording medium to be rolled from the leading edge, a thickness, or a type (rigidity) thereof may be considered to calculate the length thereof more accurately. The information described above may be input by the user or maybe detected by the sensor or the encoder of the recording apparatus 100.

Moreover, as another method, the outer periphery of the recording medium rolled by the rolling device 3 may be directly detected using the sensor. In any way, according to the present exemplary embodiment, the information about the outer periphery when the recording medium is finally stored in a roll shape needs to be acquired. As a specific example, the information includes the outer periphery of the recording medium rolled by the rolling device 3, the diameter and the length of the outer periphery of the paper pipe.

According to the above-described exemplary embodiment, the recording apparatus includes the rolling device 3 as an example. However, the recording apparatus may not include the rolling device 3. In such a configuration, the length of the outer periphery of the recording medium when the recording medium is stored in a roll shape is estimated. The recording medium is cut with the margin amount set according to the outer periphery, behind the normal cutting position, to acquire the similar operation effect.

More specifically, when the recording medium on which recording has been finished is cut and separated and the user rolls it with his hands to store it, the image of the recording medium cannot be exposed on the outer periphery, thereby reducing the damage and contamination of the image with dust.

Further, in addition to a case where the user rolls with his hands the recording medium on which recording has been finished, a rolling device separated from the recording apparatus 100 can be used.

In such a configuration, to estimate (calculate) the outer periphery when the recording medium is rolled in a roll shape, at least one piece of information such as the length from the leading edge to the trailing edge of the recording medium, the thickness, or the type (rigidity) thereof, is necessary. The information described above may be input by the user via the operation panel 15, or the length from the leading edge to the trailing edge of the recording medium, the thickness, and the type (rigidity) thereof may be detected by the sensor or the encoder of the recording apparatus.

The paper pipe used when the recording medium is stored in a roll shape may be substituted by a member in a columnar shape or other shapes (oval shape, polygonal shape, and star-like shape) on which the recording medium can be rolled. When the recording medium is rolled by the member in other shapes than the columnar shape, at least one piece of information such as the length of the outer periphery, a diameter of its circumcircle, and a peripheral length of the circumcircle may be input by the user via the operation panel 15 or may be detected by the sensor or the encoder of the recording apparatus.

Further, according to the above descriptions, the recording apparatus includes the cutting device (cutter unit) 13 for cutting the recording medium as an example, however the recording apparatus does not have to include the cutting device. In other words, the recording apparatus 100 sets the margin amount according to the outer periphery of the recording medium rolled by the rolling device 3 or the outer periphery thereof rolled by the user, provides the set amount of margin behind the normal cutting position, and then records the cut mark at the newly set cut position.

Subsequently, the user cut the recording medium along the cut mark using the scissors. With this configuration, when the recording medium cut along the cut mark is stored in a roll shape, the image is not exposed on the outer periphery of the recording medium, and thus the damage and contamination of the image with dust can be reduced.

Further, the end portion at the trailing edge of the recording medium on which recording has been finished may be attached to the paper pipe so that the user may roll with his hands or the rolling device 3 may roll the recording medium around the trailing edge of the recording medium. In such a configuration, at the end portion of the leading edge of the recording medium, in addition to the normal margin, the more margin, for example the one round of the outer periphery, is to be provided.

To determine the margin amount to be provided to the end portion of the leading edge of the recording medium, before recording is started, the recording apparatus 100 causes the user to input the information including the diameter of the paper pipe on which the recording medium is rolled, the thickness, and the type (rigidity) thereof via the operation panel 15. Further, the information including the expected length of the recording medium from the leading edge to the trailing edge, the number of images to be recorded, and the image size may be input.

Furthermore, for example, when the one round of the outer periphery is added as the margin amount, if the conveyance roller is stopped at a time point when the rolling device 3 is rotated once from the normal cutting position, to cut the recording medium, the outer periphery does not need to be always calculated, thereby reducing a processing load.

According to the first exemplary embodiment, the trailing edge of the recording medium is detected using the medium detecting sensor, and based on the detected position of the trailing edge, the margin (e.g., one round of the outer periphery) can be provided at the rear end of the recording medium. With such a configuration, even when recording is performed up to almost the trailing edge of the recording medium, the damage and contamination of the image with dust can be reduced.

However, on the other hand, since the margin is provided at the trailing edge of the recording medium, if recording is stopped halfway although the image to be recorded is still not recorded, a new recording medium needs to be prepared to record the rest of the image. Therefore, when the trailing edge of the recording medium is detected, the recording apparatus 100 according to a second exemplary embodiment determines whether to set the margin on a rear end.

More specifically, when the trailing edge is detected, it is determined whether the image can be included within the recording medium in use if the image is recorded also in portions of the margin (e.g., one round of the outer periphery] for covering the outer periphery when the recording medium is stored in a roll shape and the margin (e.g., 5 mm) for bordered recording. When the image can be included within the recording medium, image recording is continued.

On the other hand, when it is determined that the image cannot be included within the recording medium, recording of the image is stopped and the set margin is provided at the trailing edge portion of the recording medium. With this arrangement, while usage of a new recording medium is suppressed, similarly to the first exemplary embodiment, the damage and contamination of the image with dust can be reduced. In the descriptions herebelow, the same reference numeral is assigned to the configuration described in the first exemplary embodiment, and its description will not be repeated.

In the recording apparatus 100 according to the present exemplary embodiment, the medium detecting sensor is disposed at a position closer to the recording medium feeding position than the first exemplary embodiment so that the trailing edge of the recording medium can be detected at an earlier stage. Particularly, in the present exemplary embodiment, since a non-recorded region having the set margin amount or more needs to be remaining when the trailing edge of the recording medium is detected, the position of the medium detecting sensor is determined in consideration of this point.

Figure 5:
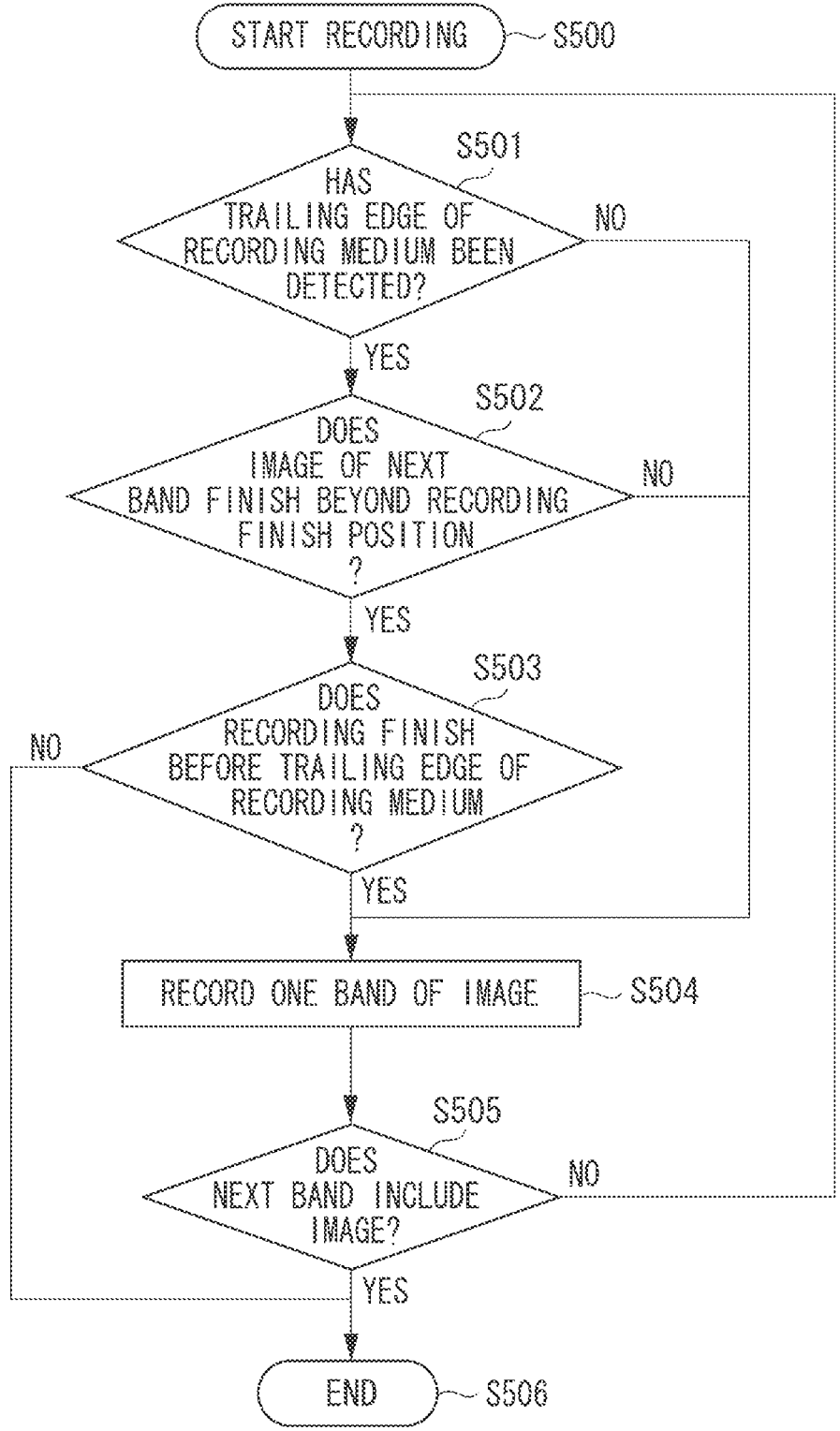

FIG. 5 is a flowchart illustrating a flow of processing when recording is performed according to the present exemplary embodiment. First, when the user selects a mode of using the rolling device 3 via the operation panel 15, as the margin amount to be provided, the one round of the outer periphery is displayed as a default value on the monitor 19 to receive the user's adjustment instruction. When the user does not change the displayed margin amount, he presses the OK button. When the user changes the margin amount, he changes the margin amount with an up/down cursor on the operation panel 15, and then presses the OK button. With the operation described above, setting of the margin amount before starting recording is completed.

When the mode of using the rolling device 3 is selected and setting of the margin amount is completed, recording is sequentially performed on the recording medium. When recording is started in step S500, in step S501, the control unit 20 confirms whether the trailing edge of the recording medium has been detected.

When the trailing edge of the recording medium has not been detected (NO in step S501), the processing proceeds to step S504 to give an instruction to the mechanism driving unit 23 and the head controller 27 to perform recording and carriage scanning to record the image of one band on the recording medium. In step S505, it is confirmed whether a next band includes the image to be recorded. When it includes the image to be recorded (YES in step S505), the processing returns to step S501 to continue the image recording.

On the other hand, when the trailing edge of the recording medium is detected (YES in step S501), the processing proceeds to step S502. In step S502, the control unit 20 confirms whether the position of the image to be recorded for the next one band at the upstream side is located beyond a recording finish position. Herein, the recording finish position refers to a position where the previously set margin amount and the margin for bordered recording are set from the trailing edge of the recording medium. If recording is completed before the position, the margin for the previously set margin amount and the margin for bordered recording can be secured.

The recording finish position is calculated based on a distance between the position of the upstream side of the image being recorded for the current band and the trailing edge of the recording medium when the trailing edge of the recording medium is detected, the set margin amount, and the margin provided in the bordered recording.

When it is determined that the position of the upstream side of the image to be recorded for the next one band is not located beyond the recording finish position (NO in step S502), the processing proceeds to step S504. The control unit 20 gives an instruction to the mechanism driving unit 23 and the head controller 27 to perform the recording medium conveyance and the carriage scanning to record the image for one band on the recording medium. In step S505, it is confirmed whether the next band includes the image to be recorded, and when it includes the image to be recorded (YES in step S505), the processing returns to step S501 to continue the image recording.

On the other hand, when it is determined that the position of the upstream side of the image to be recorded for the next one band is located beyond the recording finish position (YES in step S502), the processing proceeds to step S503. In step S503, the control unit 20 determines whether the image recording is to be completed before the trailing edge of the recording medium. When it is determined that the image recording is to be completed before the trailing edge of the recording medium (YES in step S503), the processing proceeds to step S504 to continue the image recording and complete the image on the recording medium in use.

On the other hand, when it is determined that the image recording is not to be completed before the trailing edge of the recording medium (NO in step S503), the processing proceeds to step S506 to end the image recording. When the image is recorded by multi-path recording, to complete the image for the band in the middle of the recording, an operation (closing a path) for recording the image data in the rest of the path may be performed without feeding paper.

Further, in step S506, recording may not be immediately finished but the image may be recorded up to the recording finish position. Furthermore, when the recording of the image is stopped halfway, the recording may be carried out on the new recording medium from the beginning again. For example, when the recording medium in use is utilized by jointing with the new recording medium, recording may be performed from the subsequent portion of the image that has been stopped in the middle of the recording.

As described above, according to the present exemplary embodiment, when the trailing edge of the recording medium is detected and the image can be recorded up to the trailing edge, the image recording is continued. When the image cannot be recorded, the image recording is stopped and the margin that is the set margin amount or more is provided at the trailing edge portion of the recording medium. With this arrangement, while the wasteful usage of the recording medium is suppressed, when the recording medium is stored in a roll shape, the outer periphery of the recording medium is provided with the margin, so that the damage and contamination of the image with dust can be reduced.

In the above descriptions, when the image is included before the trailing edge of the recording medium, the image recording is automatically continued. However, the user may select whether to perform such processing.

Further, as a modification of the present exemplary embodiment, when the previously set margin amount is sufficiently large to cover the outer periphery, if the image can be included within the recording medium in use by changing the margin amount to a smaller value, the image recording may be continued. On the other hand, if the image cannot be included, the image recording may be stopped and the margin may be provided at the trailing edge portion of the recording medium.

For example, when the previously set margin amount is two rounds of the outer periphery of the recording medium, if the image can be included within the recording medium by changing the margin amount to the one round thereof, the image recording may be continued. When it is not included, the image recording can be stopped.

Furthermore, as another modification, instead of detecting the trailing edge of the recording medium using the medium detecting sensor, by always managing a distance from the leading edge of the recording medium, the position of the trailing edge of the recording medium may be always grasped. In this configuration, since the trailing edge of the recording medium can be always grasped, whether the image can be included before the trailing edge of the recording medium can be determined for each image to be recorded.

When the image is included before the trailing edge of the recording medium, the image recording is performed. On the other hand, when it is not included, the image recording is stopped, and the margin of the set margin amount or more is provided at the trailing edge portion. In such a configuration, since the recording is not stopped in the middle of the image, the image at some point of the recording can be avoided from appearing at the trailing edge portion of the recording medium.

In the above descriptions, the "margin" is defined as a region in which nothing is recorded, however, the "margin" that can be applied to the above-described exemplary embodiment is not limited to the region in which nothing is recorded. For example, some images (e.g., design) may be recorded in the "margin".

In the above descriptions, the control unit included in the recording apparatus functions as a unit for setting the margin amount, and the recording apparatus serves as the setting device according to the exemplary embodiment as an example. However, the exemplary embodiment is not limited to such a configuration. The margin amount may be set by the control unit (CPU) of a host device connected to the recording apparatus.

For example, the host device into which a printer driver is installed may request from the recording apparatus information about the outer periphery rolled on the rolling device 3, and cause the user to input the diameter of the paper pipe via an input unit, to set the margin amount based on these information. Subsequently, the margin amount set by the host device is transmitted to the recording apparatus, which cuts the recording medium with the margin amount set by the host device. In such a case, the host device (external device) connected to the recording apparatus serves as the setting device.

Further, the exemplary embodiment can be applied to a recording system including the recording apparatus and the host device (external device). Furthermore, the exemplary embodiment can be realized by a program code included in a computer-readable program for realizing a function for setting the above-described margin amount, or the recording medium storing the program code.

In such a case, the above-described processing can be realized when one computer (CPU or micro processing unit (MPU)) or a plurality of computers included in the host device or the image forming apparatus read and execute the above-described program code in association with each other. As described above, the exemplary embodiment includes the above-described computer-readable program for causing the computer to execute the processing for setting the margin amount or a storage medium storing the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-090368 filed Apr. 14, 2011, which is hereby incorporated by reference herein in its entirety.

What is claimed is:

1. A setting apparatus for setting a length of a margin for a recording medium on which an image is recorded by a recording unit, the setting apparatus comprising:
a confirmation unit configured to confirm information about a length of an outer periphery when the recording medium is rolled in a roll shape; and
a setting unit configured to set the length of the margin based on the information about the length of the outer periphery confirmed by the confirmation unit.

2. The setting apparatus according to claim 1, further comprising:
   a presentation unit configured to present to a user the length of the margin set by the setting unit, and
   an adjustment unit configured to adjust the length of the margin set by the setting unit according to a user's instruction.

3. The setting apparatus according to claim 1, wherein the information about the length of the outer periphery of the recording medium is information about a length of an outer periphery of a member in a columnar shape on which the recording medium is rolled in a roll shape.

4. The setting apparatus according to claim 3, wherein the information about the length of the outer periphery of the recording medium includes at least one of the length of the recording medium when the recording medium is rolled in a roll shape, a thickness thereof, and a type thereof.

5. The setting apparatus according to claim 1, wherein, when the recording medium has a predetermined width or more, the setting unit sets the length of the margin.

6. The setting apparatus according to claim 1, wherein the setting unit sets, as the length of the margin, the length of the recording medium of one round or more of the outer periphery when the recording medium is rolled in a roll shape.

7. The setting apparatus according to claim 1, further comprising a recording unit configured to record the image on the recording medium.

8. The setting apparatus according to claim 7, wherein, based on the length of the margin set by the setting unit, the recording unit records on the recording medium information about a position where the recording medium is to be cut.

9. The setting apparatus according to claim 7, further comprising a cutting unit configured to cut the recording medium on which the image is recorded,
   wherein the cutting unit, based on the length of the margin set by the setting unit, cuts the recording medium.

10. The setting apparatus according to claim 9, further comprising a determination unit configured to determine according to a type of the recording medium, whether the cutting unit cuts the recording medium based on the length of the margin set by the setting unit, or the recording unit records the information about the position where the recording medium is to be cut based on the length of the margin set by the setting unit.

11. The setting apparatus according to claim 7, further comprising a rolling unit configured to roll the recording medium on which the image is recorded by the recording unit.

12. The setting apparatus according to claim 11, wherein the information about the length of the outer periphery of the recording medium refers to the length of the outer periphery of the recording medium rolled by the rolling unit.

13. The setting apparatus according to claim 7, further comprising a determination unit configured to determine whether the image to be recorded can be recorded on the recording medium when the length of the margin set by the setting unit is not provided,
   wherein, when the determination unit determines that the image can be recorded, the recording unit records the image to be recorded on the recording medium regardless of the margin set by the setting unit.

14. A setting method which is executed in a setting apparatus having a CPU for setting a length of a margin for a recording medium on which an image is recorded by a recording unit, comprising:
   confirming the information about a length of an outer periphery when the recording medium is rolled in a roll shape; and
   setting the length of the margin based on the information about the confirmed length of the outer periphery.

15. A non-transitory computer readable storage medium storing a computer executable program for setting a length of a margin for a recording medium on which an image is recorded by a recording unit, comprising:
   confirming the information about a length of an outer periphery of the recording medium when the recording medium is stored in a roll shape;
   setting the length of the margin based on the information about the confirmed length of the outer periphery.

* * * * *